Oct. 12, 1965 G. L. ALLERTON ETAL 3,212,000
METHODS OF DETERMINING SEMICONDUCTOR THICKNESS AND RESISTIVITY
BY LOSS IN A TRANSMISSION LINE
Filed May 31, 1960 3 Sheets-Sheet 1

INVENTORS
G.L. ALLERTON
J.R. SEIFERT
L.T. STARK

By /. Gundersen
ATTORNEY

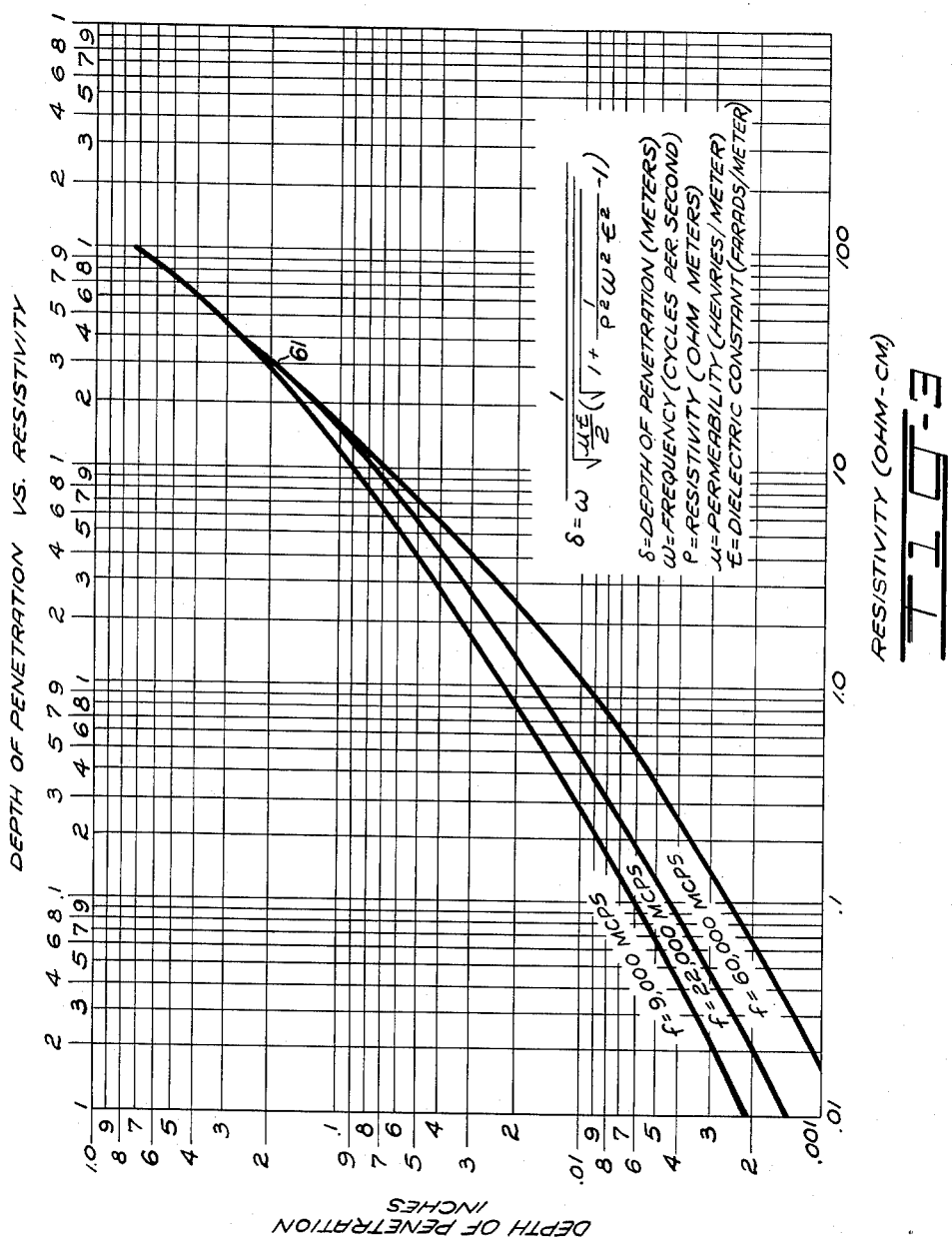

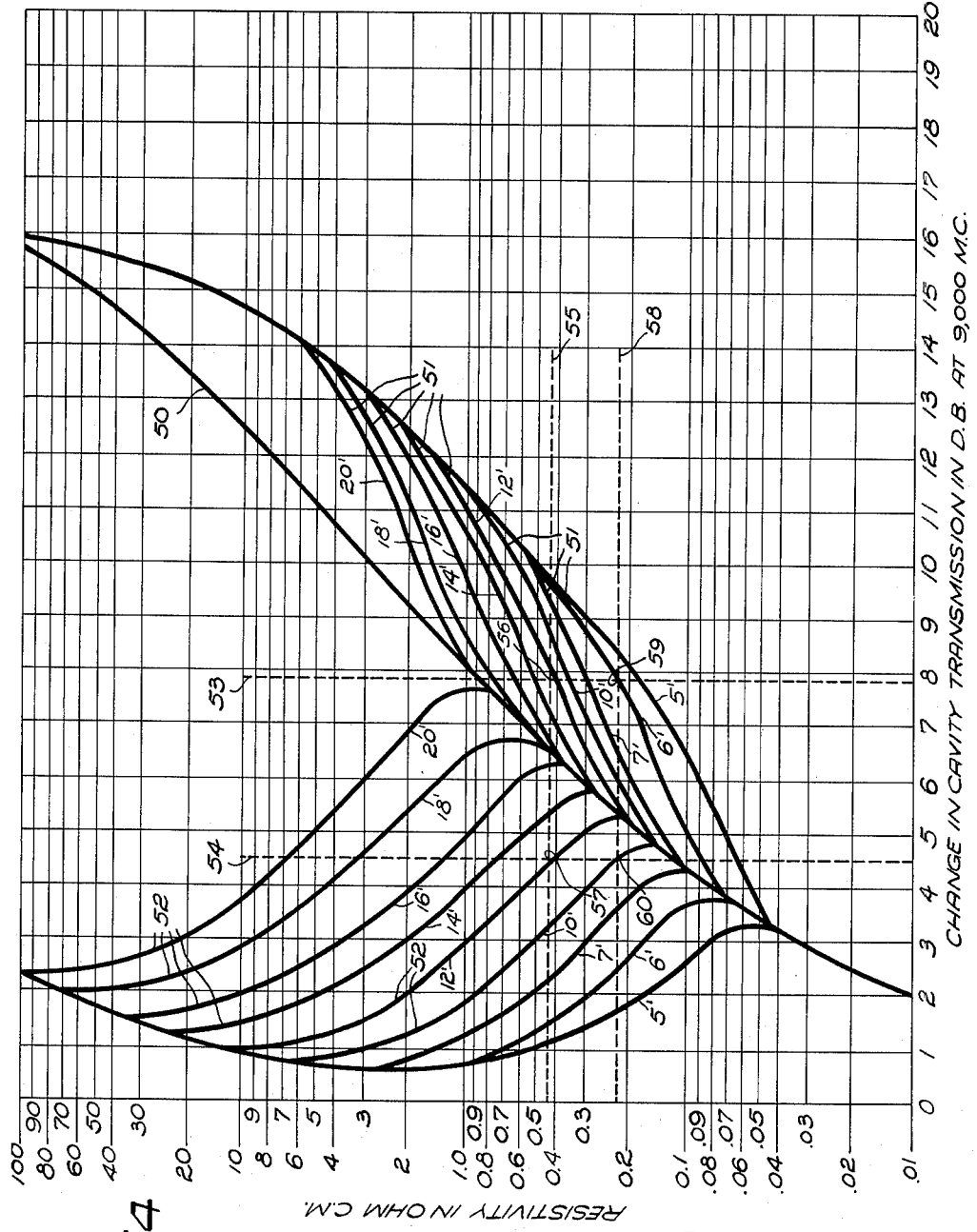

United States Patent Office 3,212,000
Patented Oct. 12, 1965

3,212,000
METHODS OF DETERMINING SEMICONDUCTOR THICKNESS AND RESISTIVITY BY LOSS IN A TRANSMISSION LINE
George L. Allerton, Orefield and James R. Seifert, Bethlehem, Pa., and Leon T. Stark, Elmhurst, N.Y., assignors to Western Electric Company, Incorporated, New York, N.Y., a corporation of New York
Filed May 31, 1960, Ser. No. 32,756
5 Claims. (Cl. 324—62)

This invention relates to the measurement of electrical resistivity and physical dimensions of conductive materials and particularly to methods of determining the resistivities and thickness of semiconductor materials.

In the fabrication of semiconductor material for electrical devices, such as transistors and diodes, measurement of the resistivity of the material is an essential and crucial undertaking, since the eventual circuit properties of the devices are largely determined by this parameter. Heretofore a technique known as the four-point probe method has been widely applied to this measurement. As used in both volume and sheet resistivity measurements, the four-point probe method entails establishing simultaneous point contacts at a surface of the material under test with four spaced-apart probes. A current is then caused to flow between two of the probes, and voltage readings for the remaining two probes determined. The functional relationships between the voltages and currents for various geometries of semiconductor configuration and probe placement permit the determination of resistivity.

While the four-point method may have particular advantages in certain situations, for example in laboratory investigations of field distributions in semiconductor bodies, it has disadvantages in application to production testing. Probably the most significant of these disadvantages is the necessity of establishing a physical contact between the material under test and the probes. This physical contact is inevitably destructive to some extent of the tested body. Another consequence is the introduction of impurities contained either on the probe surface or as an impurity in the probe material. The disadvantages are compounded when a pattern of multiple tests are undertaken according to one advanced technique and by the necessity of precisely positioning the probes. Minimizing these effects requires expenditures in time and applications of sophisticated control devices and techniques which add considerably to production expenses. Directly linked to the need for greater care and more complex test equipment is an increase in labor cost.

However, even with the minimization of material damaging effects discussed above, the four-point probe method has other shortcomings. Frequently, it is desirable to determine the resistivity of a surface layer independently of the resistivity of deeper layers of the material. Such sheet resistivity measurements are particularly difficult to obtain with the point probes, and they are speculative when obtained due to the difficulty of analyzing the field distribution. Solutions to this problem depend upon complex functions which are inconvenient to apply to practical manufacturing set-ups. Furthermore, this technique requires a thickness measurement of the sample in order to solve for the unknown, a demanding and, therefore, costly step since the dimensions frequently are in the order of a few thousandths of an inch.

It is, therefore, an object of the invention to provide accurate and speedy methods of measuring the resistivity of materials.

A further object is to provide semiconductor resistivity measuring methods which eliminates the necessity for point contacts between test probes and the material under test.

An additional object is to provide methods of measuring resistivity to a given depth without the necessity for measuring a physical dimension in the test sample.

Still another object is to provide methods of measuring the thickness of semiconductor material.

According to the invention, a portion of a high frequency transmission media, such as a wave guide or resonant cavity, has an aperture in its walls. Retainer structure including at least two backing pieces, each having a different conductivity, is provided for holding at least a portion of a test sample in the aperture. A high frequency test signal source feeds into the transmission line and is modified by the variously backed sample. A measuring instrument is located in the circuit to measure the modified signal. Resistivity or thickness is then determined by relating the modified signal to graphs which indicate the amount of resistivity attributable to a certain amount of signal modification.

In one embodiment of the invention, the transmission line is a wave guide. The test sample inserted in the aperture acts as a line termination, and the signal modification is measured by comparing input signals with reflected signals from the termination. Another embodiment of the invention has, as the transmission line, a high Q resonant cavity loosely coupling a signal source to a load. Modification of the input signal to the cavity is measured at the load.

These and other aspects of the invention will be more readily understood from the following detailed description taken in conjunction with the accompanying drawing in which:

FIG. 4 is a graph showing resistivity versus transmission characteristics for varied thickness samples backed with materials of two different resistivities, FIG. 5 is a schematic illustration of the apparatus used for a thickness measurement.

Figure 1:
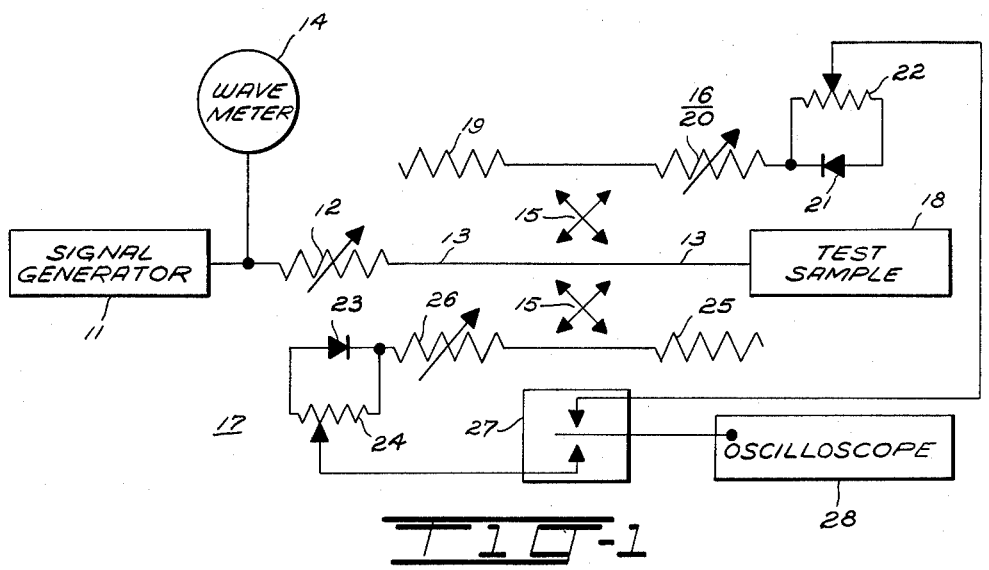
FIG. 1 is a circuit diagram illustrating apparatus for testing the sample as a termination of a transmission line in accordance with this invention.

Referring now to the drawing, FIG. 1 illustrates one embodiment of the invention which, like all other embodiments, eliminates entirely the problems of the four-point probe method deriving from physical contact between the probes and the sample under test. Furthermore, as will be subsequently explained in greater detail, rapid and accurate resistivity and thickness measurements of thin sliced low resistivity material are obtainable by this and other embodiments. In addition, selected pinpoint areas of the sample surface can be effectively tested by the invention to an extent impossible with the four-point probe. These advantages are accomplished in the arrangement of FIG. 1 by terminating a transmission line with a combination of test sample and backing material of different conductivities. A high frequency signal transmitted through the line is reflected in a characteristic way and from this reflected signal either the sample resistivity, or its thickness, or both resistivity and thickness, are determined.

In FIG. 1 a signal generator 11 feeds a high frequency signal, which may be advantageously in the 8,000 to 65,000 meacycle range, through attenuator 12 into transmission line 13. Wave meter 14 at the output of generator 11 measures the output frequency of the signal. Connected in line 13 is directional coupler 15, a four terminal hybrid junction, which by virtue of impedance relationships diverts portions of signals in line 13 either into an upper monitor circuit indicated generally as 16 or a lower monitor circuit indicated as 17. Both monitor circuits are similarly arranged circuitwise although by virtue of the directional characteristic of coupler 15 they are impressed with different signals: circuit 16 with the incident signal from the generator as modified by attenuator 12, and circuit 17 with the signal reflected by the line terminating test sample 18.

Monitor circuit 16 has balancing impedance 19 for establishing the proper matching with directional coupler 15 to cause the incident or input signal from the signal generator 11 to enter the circuit. On the other side of the coupler 15 from impedance 19 in monitor circuit 16, variable attenuator 20 is connected in series with diode detector 21. In parallel with diode 21 is potentiometer 22 which serves to compensate for the differences in operating characteristics between diode 21 in monitor circuit 16 and diode 23 in monitor circuit 17. Potentiometer 24 in monitor circuit 17 serves a similar balancing function.

Balancing impedance 25 and variable attenuator 26 in monitor circuit 17 are analogous to attenuator 20 and impedance 19 but are in a position relative to the directional coupler to cause the reflected signal from test sample 18 to appear in circuit 17. The outputs of circuits 16 and 17 are taken from the respective potentiometers 22 and 23 to opposing contacts of switch 27. As a matter of convenience switch 27 is electrically operated to switch oscilloscope 28 from the output of circuit 16 to that of circuit 17 at a 30-cycle per second rate so that both outputs appear simultaneously on the oscilloscope screen.

Utilization of the apparatus of FIG. 1 will now be described. Signal generator 11 is selected to operate at 9,000 megacycles which will require a rectangular wave guide functioning as the transmission line 13 to have inside dimensions of 0.400 x 0.900 inch. With the test sample 18 placed across the entire open end of the wave guide, thus terminating it, an equal area will be tested. This area may be reduced if desired by providing a highly conductive terminal wall with an aperture of the dimensions desired to be tested, into which the sample is inserted, or by an iris arrangement, or by various modifications of the plural backing and support structure. The support structure can be adapted to rapid changeover of backings and samples. One embodiment, for example, envisages the backing materials mounted on a slide which supports the sample in the aperture. Change of backings is accomplished by displacing the slide without removing the sample from the aperture.

Figure 3:
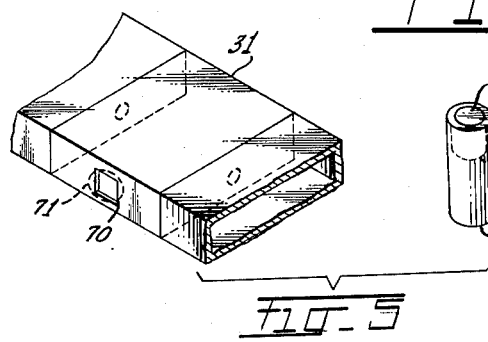
FIG. 3 is a graph depicting the relationship of penetration depth to resistivity for several frequencies.

The penetration depth of the signal into the sample is a function of the frequency and resistivity of the material. As shown in FIG. 3, a reduction in penetration accompanies an increase in signal frequency to a resistivity of approximately 12 ohm-centimeters at converging point 61. Increasing the frequency also reduces the dimensions of the wave guide and, thereby, the area covered by the test when the sample covers the entire cross section of the wave guide. The proper choice of test signal frequency is dependent upon the magnitude of the sheet depth and area to be measured. This invention is principally concerned with the measurement of resistivity and thickness of samples in which the signal penetration depth may exceed the thickness of the material. Since the full advantage of the invention's double backing technique depends upon complete penetration of the sample and impingement of the signal upon the backing material, selection of the test frequency especially in production runs is also substantially influenced by the range of thicknesses of a given test sample lot.

At 9,000 megacycles, the depth of signal penetration will be related to the material resistivity as follows:

| Material resistivity (ohm-cm.) | Penetration depth (inch) |
| --- | --- |
| 0.01 | 0.0021 |
| 0.1 | 0.0066 |
| 1.0 | 0.021 |
| 10.0 | 0.087 |
| 100.0 | 0.726 |

It is convenient to measure the characteristics of the sample in the device of FIG. 1 by determination of the reflection coefficient of the termination. A perfect conductor as a termination has a reflection coefficient of one, while increasing resistivity progressively exhibits lower orders of reflection coefficient until the terminal impedance matches that of the line and all the power is absorbed at the termination. Between these two limits, a relation between resistivity and reflection coefficient exists. A return loss in decibels equals twenty times the log to the base 10 of the reflection coefficient.

Measurement of the return loss of the sample with each of the different resistivity backings is made by comparison with a "perfect" conductor in the same aperture. To establish a reference or calibration, a good conductor, such as brass or aluminum, is inserted at position 18 to terminate the wave guide. Calibrated attenuators 20 and 26 are both set at the same arbitrary value in excess of the expected transmission loss. Balance attenuators 22 and 24 are adjusted for equal amplitude of signals in monitor circuits 16 and 17, as indicated on the oscilloscope. The good conductor is then removed from test position 18, and the test sample with one of the backings is inserted in the aperture. A drop in the reflected signal will occur due to the decreased reflection from the more resistive material in the aperture. Attenuator 26 is then adjusted to remove attenuation from the reflected signal circuit 17 until the input, or incident, and reflected, or echo, signals are again equal on the oscilloscope. The difference in readings between the setting of attenuator 20 (or the setting of attenuator 26 with the perfect conductor in the test position) is the return loss in decibels attributable to the backed sample. This loss value is noted and the sample backing changed to one having a different resistivity. Return loss is then measured for the sample with the second backing in the same way. The calibration step, of course, is not ordinarily necessary for different backings or successive samples. An aspect of the invention is a support structure for holding the sample and different backings in proper position in the aperture for rapid exchange of backings and accurate placement of the newly backed sample, so that substantially the same area of the sample surface is exposed to the signal with the first as with the second backing. From the two return loss readings, both the resistivity and thickness of the sample may be determined by referring, most conveniently, to a graph similar to that of FIG. 4, as will be demonstrated below.

It may be desired to measure a smaller area of sample at the same frequency and with substantially the same equipment. This can be done by masking off a part of the wave guide opening with a good conducting surface, such a gold plated brass, or by using a tapered transition section to a smaller terminal area. In these situations, graphs for the particular configuration can be constructed by using samples of known resistivities and determining their losses in the specific device. The advantage of being able to handle new test requirements more or less empirically in this way without recourse to complicated theoretical analysis is apparent.

Figure 2:
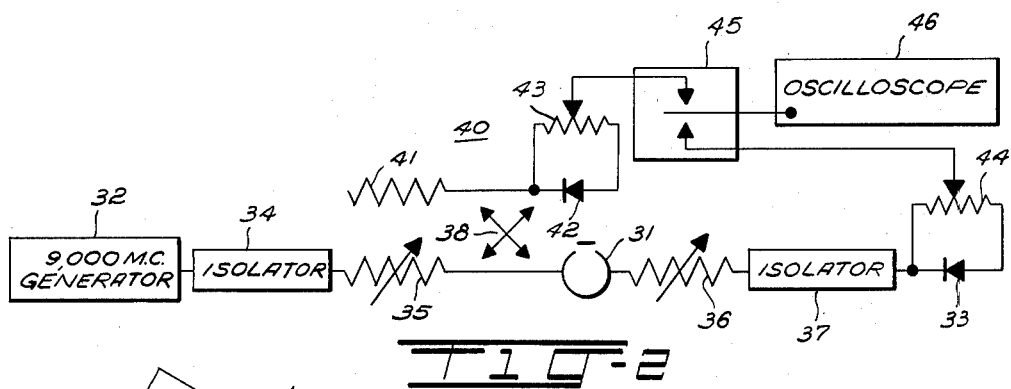
FIG. 2 is a circuit diagram of an inventive embodiment in which the test sample is incorporated in a resonant cavity portion of a transmission line.

A greater range of resistivities can be measured at the same test frequency with the apparatus of FIG. 2 according to the invention. In this apparatus, a high Q resonant cavity 31 lightly couples a signal generator 32 to a crystal detector load 33. Isolator 34 and attenuator 35 are connected in series between generator 32 and cavity 31, and calibrated attenuator 36 and isolator 37 are connected in series between the cavity output and the load crystal 33. The isolators 34 and 37 serve to prevent feedback into the generator and cavity, respectively, of reflections while the attenuators function as described below.

Directional coupler 38, a hybrid junction, couples the input of cavity 31 to monitor circuit 40. Circuit 40 comprises balance impedance 41 on one side of the coupler and diode detector 42 on the other side. Potentiometers 43 and 44 are in parallel with diodes 42 and 33, respectively, to balance out differences in the diode operating characteristics. The outputs of potentiometers 43 and 44 are led to switch 45, which alternately applies them to oscilloscope 46.

The signal transmitted between the input and output of cavity 31 is proportional to the Q of the cavity. Variation of the Q is accomplished by using some of the material to be tested with appropriate backing as a portion of the resonant cavity wall. Measurements of the difference in transmitted signal level between a good conductor, such as gold plated brass, and the backed sample of reduced conductivity are related to resistivity and thickness, as shown in the curves of FIG. 4.

The set of FIG. 2 is operated as follows. A high conductivity reference plate which may be of gold plated brass is inserted in the test sample hole of cavity 31. The frequency of signal generator 32 is adjusted to the resonant frequency of the cavity 31, as indicated by a maximum signal on oscilloscope 46. Attenuation is then inserted in the cavity circuit with attenuator 36, in excess of the attenuation which would cause the same signal reduction as the cavity loaded with the test sample. Balance potentiometers 43 and 44 are adjusted until the input signal passing through circuit 40, and the cavity signal trace have the same value. The set is now calibrated, and the reference plate is removed from the cavity, and the test sample mounted with one of the backing plates inserted. Attenuator 36 is adjusted to bring the two signals to the same level. The amount of attenuation removed from the circuit is the change in transmission loss. Expressed another way, the difference after calibration of the settings of attenuator 36 with the cavity loaded first by the highly conductive reference plate and then by the backed test sample is the change in transmission loss. The sample backing is then changed and another loss reading taken for the same sample portion.

The sample loss readings with the different backings are used to determine the resistivity and thickness values of the sample by reference to graphs similar to that shown in FIG. 4. Each wave guide or cavity used in these tests could have its individual plot of this type eliminating entirely any computation and also, of course, eliminating the necessity for evaluating the myriad environmental factors which affect the result. The data of FIG. 4 is for a resonant cavity used with the test system of FIG. 2 at a test frequency of 9,000 megacycles. Resistivity of the sample in ohm-centimeters is represented on the ordinate and transmission loss, due to the sample in the cavity aperture, in terms of decibles down from the transmission characteristics of a perfect conductor on the abscissa.

Line 50 is the resistivity versus loss curve for samples whose thicknesses exceed the penetration depth of the signal. Curves 51 are a family for samples of different thicknesses backed with material of 100 ohm-centimeter resistivity. Curves 52 are a family for samples of different thickness backed with brass, a "perfect" conductor. The primed numbers on each curve indicate thickness in thousandths of an inch. Lines 53 and 54 represent the loss readings of a sample backed respectively with the 100 ohm-centimeter material and the brass. Determination of unique values for the resistivity and thickness of the sample is predicated on the knowledge that lines 53 and 54 must intersect curves for the same thickness material in both families 51 and 52 on the same resistivity (horizontal) line. This unique intersection occurs with resistivity line 55 which the loss lines 53 and 54 meet at points 56 and 57 where curves for 12 thousandths thick material from families 51 and 52 also intersect. The correct sample resistivity is thus 0.41 ohm-centimeter and its thickness 12 thousandths of an inch. All other intersections lack this coincidence as, for example, those provided by resistivity line 58. Point 59 at the crossing of 53 and 58 touches a curve 51 for six thousandths material, while at point 60 the curve 52 is for ten thousandths material, indicating an indeterminate thickness and incorrect resistivity.

In FIG. 5, 31 is a cavity resonator forming a part of wave guide transmission line and having an aperture 70 therein over which is placed a semiconductor slice 71, shown in dotted lines. A holder 72 for backing the slice is shown. The holder 72 is composed of a high conductivity material, such as brass, and includes at one end thereof an inset 74 of material of 100 ohm-centimeter resistivity which may be cemented into the opening 75. Thus, after the semiconductor slice 71 is placed over the aperture 70, the high conductivity end 73 of the cylinder is placed on top of the slice to make a first measurement. Thereafter, the position of the cylinder is inverted and the inset 74 is placed on top of the slice to make a second measurement. Which measurement is made first is not material.

It is to be understood that the above described arrangements and methods are merely illustrative of the principles and application of the invention. Other arrangements may be devised by those skilled in the art which incorporate the essence of the invention and fall within its spirit and scope.

What is claimed is:

1. A method of determining the thickness and resistivity of test samples using a high frequency test signal which comprises the steps of backing the sample with a material of a first conductivity having a thickness such that the sum of the thicknesses of the sample and the backing material exceeds the penetration capability of the signal through the thus backed test sample, inserting the backed sample in a transmission line for carrying the high frequency test signal and measuring the transmission characteristics of the path, separating the sample from the backing, backing the sample with a material of a second conductivity having a thickness such that the sum of the thicknesses of the sample and the backing material exceeds the penetration capability of the signal through the thus backed test sample, inserting the backed sample in the transmission line and measuring the transmission characteristics of the path, and determining the thickness and resistivity of the sample from the known resistivity versus transmission characteristics for samples of different thicknesses backed with the materials of first and second conductivities respectively.

2. Method according to claim 1, wherein each respectively backed sample is applied to an aperture in a high Q resonant cavity forming a portion of a transmission line.

3. Method according to claim 1, wherein each respectively backed sample is applied as a termination to a wave guide.

4. Method according to claim 1 wherein one of the backings is a substantially perfect conductor and the other of the backings includes resistivity material.

5. Method according to claim 4, wherein the resistivity material has a resistivity of about 100 ohm-centimeters.

References Cited by the Examiner

UNITED STATES PATENTS

| | | | |
|---|---|---|---|
| 2,602,828 | 7/52 | Norton | 324—58 X |
| 2,611,804 | 9/52 | Zaleski | 324—58.5 |
| 2,817,813 | 12/57 | Rowen | 324—58.5 |
| 2,907,961 | 10/59 | Tomiyasu | 323—81 |

(Other references on following page)

OTHER REFERENCES

Artmann: "Measurement of Susceptibility of Tensor in Ferrites," Journal of Applied Physics, vol. 26, No. 9, September 1955.

Beck: "Conductivity Measurements at Microwave Frequencies," Bell Laboratories Record, October 1950, vol. XXVIII, No. 10, pp. 433–437.

"Conductivity of Metallic Surfaces at Microwave Frequencies," article in Journal of Applied Physics, July 1947, pp. 629–638.

Surber et al.: "Dielectric Measurement Methods for Solids at Microwave Frequencies," Journal of Applied Physics, December 1948, pp. 1130–1139.

Thorp: "RF Conductivity in Copper at 8 mm. Wavelengths," Proc. of IEE, vol. 101, part III, No. 74, November 1954; pp. 357–359.

WALTER L. CARLSON, *Primary Examiner.*

SAMUEL BERNSTEIN, *Examiner.*